United States Patent [19]
Ieda

[11] Patent Number: 5,714,742
[45] Date of Patent: Feb. 3, 1998

[54] IC-CARD READER/WRITER FOR AN IC-CARD

[75] Inventor: Tomoaki Ieda, Neyagawa, Japan

[73] Assignee: Matsushita Electric Industrial Co., Ltd., Osaka-Fu, Japan

[21] Appl. No.: 636,210

[22] Filed: Apr. 22, 1996

[30] Foreign Application Priority Data

May 10, 1995 [JP] Japan .................. 7-111452

[51] Int. Cl.⁶ .................................................. G06K 7/06
[52] U.S. Cl. .................................... 235/441; 235/492
[58] Field of Search ............................ 235/441, 492

[56] References Cited

U.S. PATENT DOCUMENTS 5,053,199  10/1991  Keiser et al. ................ 235/492 X
5,269,707  12/1993  Reichardt et al. .
5,334,827   8/1994  Bleier et al. .

*Primary Examiner*—Harold Pitts
*Attorney, Agent, or Firm*—Panitch Schwarze Jacobs & Nadel, P.C.

[57] ABSTRACT

An IC-card reader/writer for an IC-card has an insertion chamber (7) for receiving the IC-card (80), plural contact springs (5a1, 5a2, 5a3) for contacting plural contact regions (C1–C4) provided in a front row of the IC-card (80), and at least two contact springs (5a5, 5a7) for contacting plural contact regions (C5–C8) provided in a rear row of the IC-card (80); the plural contact springs (5a1, 5a2, 5a3) are disposed between the at least two contact springs (5a5, 5a7) in the insertion chamber (7).

8 Claims, 11 Drawing Sheets

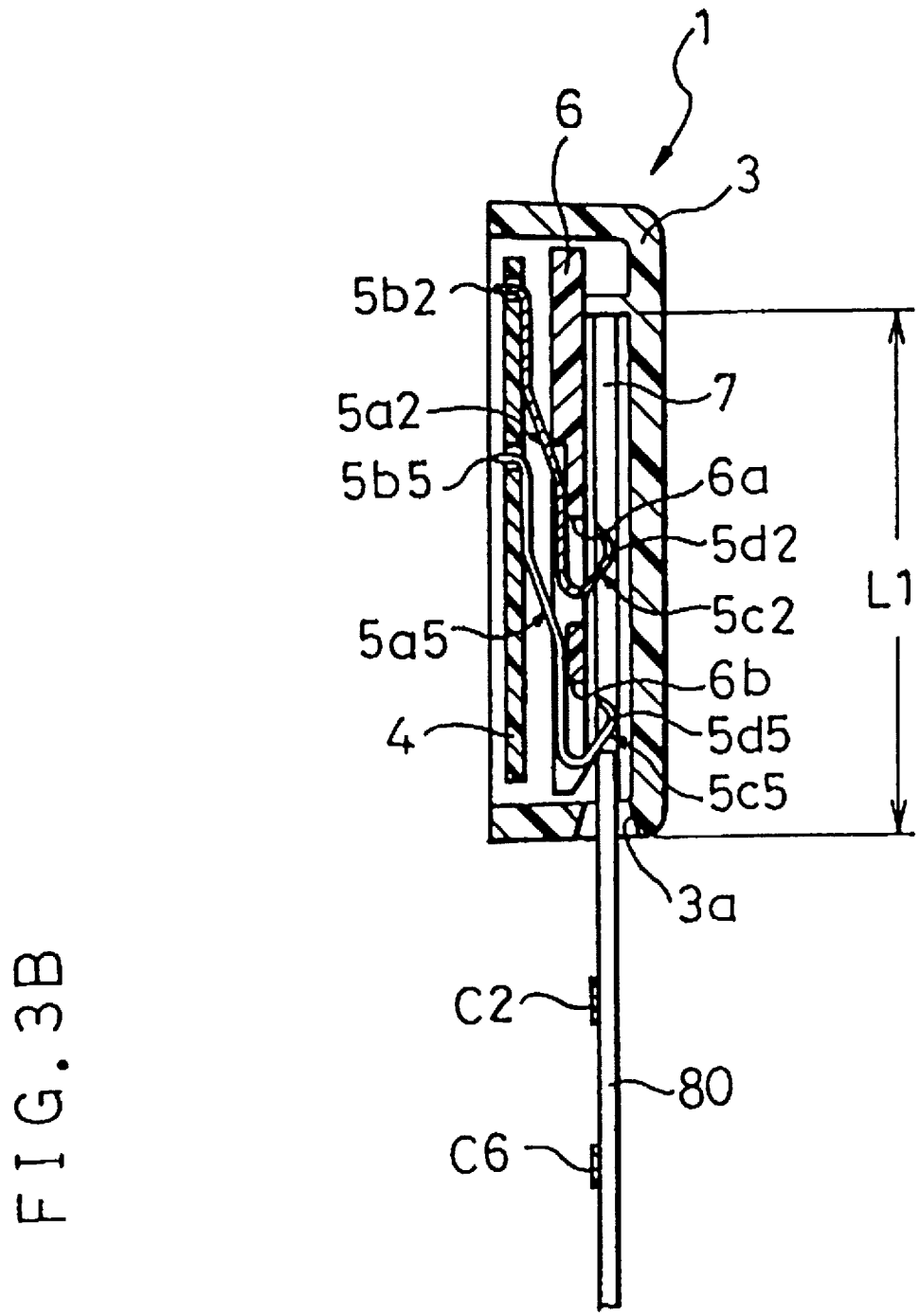

IC-CARD READER/WRITER FOR AN IC-CARD

FIELD OF THE INVENTION AND RELATED ART STATEMENT

1. Field of the Invention

This invention relates to an IC(integrated circuit)-card reader/writer for an IC-card which is to be used for memorizing data such as personal informations in the field of finance, medicine and communication or the like.

2. Description of the Prior Art

An IC(integrated circuit)-card comprises a card-shaped plate and an integrated circuit embedded in the card-shaped plate. The integrated circuit includes a microprocessor unit and a memory, and is formed on a one-chip of a semiconductor chip. In recent years, the IC-card is widely put into practical use in the field of finance, medicine and communication or the like, because the IC-card has superior features about multifunction and security for stored data in the memory. With the spread of the IC-card, demand to decrease size of an IC-card reader/writer, which is used for reading and writing data, is arising for realization of a portable type apparatus.

A conventional IC-card reader/writer will be explained with reference to FIG. 8, FIG. 9A and FIG. 9B. FIG. 8 is a front view showing a conventional IC-card reader/writer described in U.S. Pat. No. 5,334,827. FIG. 9A is a plan view showing the conventional IC-card reader/writer of FIG. 8 in a state receiving the IC-card. FIG. 9B is a cross sectional view taken on line IXB—IXB in FIG. 9A.

As shown in FIG. 8, a conventional IC-card reader/writer 50 has an outer case 51 configured with a contact support member 51a and a cover plate 51b fixed to the contact support member 51a. An insertion chamber 52 for an IC-card 80 (FIG. 9A) is formed in the outer case 51 so that an opening 52a of the insertion chamber 52 is disposed at the front of the conventional IC-card reader/writer 50.

As shown in FIGS. 9A and 9B, four contact springs 53a and four contact springs 53b are disposed in the contact support member 51a. The respective four contact springs 53a and 53b are arranged in parallel with an inserting direction X of the IC-card 80. In the IC-card 80, it is known that eight contact regions are arranged in two rows in accordance with a standard such as the ISO standard 7816. For example, as shown in FIG. 9B, one of the four contact springs 53a comes in contact with the contact region C1 provided in one row of the two rows on a main surface of the IC-card 80. And one of the four contact springs 53b comes in contact with the contact region C5 provided in the other row of the two rows on the main surface of the IC-card 80.

To describe these contact springs 53a and 53b concretely, each of the four contact springs 53a comprises a terminal part 53aa and an end part 53ab having a contact 53ac. The terminal part 53aa is connected and fixed to a printed circuit board 54 (shown by a two-dot chain line in FIG. 9B). The end part 53ab is located in the side of the opening 52a with respect to the terminal part 53aa. The end part 53ab is biased toward the cover plate 51b so that the contact 53ac comes in contact with the contact region C1 at a predetermined contact pressure.

Similarly, each of the four contact springs 53b comprises a terminal part 53ba and an end part 53bb having a contact 53bc. The terminal part 53ba is connected and fixed to the printed circuit board 54. The end part 53bb is located in the opposite side of the opening 52a with respect to the terminal part 53ba. The end part 53bb is biased toward the cover plate 51b so that the contact 53bc comes in contact with the contact region C5 at the predetermined contact pressure.

In the conventional IC-card reader/writer 50, when the IC-card 80 is inserted in the innermost part of the insertion chamber 52, the contacts 53ac and 53bc come in contact with the contact regions of the IC-card 80. Thereby, data are transmitted between the conventional IC-card reader/writer 50 and the IC-card 80.

However, in the conventional IC-card reader/writer 50, the four parallel contact springs 53a are disposed respectively in line with the four parallel contact springs 53b, in the inserting direction X, so that the four end parts 53ab are faced disposed close to the four end parts 53bb, respectively. Therefore, a depth of the insertion chamber 52 must be at least about the sum of a length L2 between the contact region C5 and one end of the IC-card 80 and a length L3 between the terminal part 53ba and the contact 53bc. As a result, there is a problem that the size of the conventional IC-card reader/writer 50 can not be reduced drastically.

Furthermore, in the conventional IC-card reader/writer 50, respective portions L4 and L4' do not operate as an elastic member. Therefore, in order to stably obtain the predetermined contact pressure, it is preferable to enlarge the length L3 and a length L3' between the terminal part 53aa and the contact 53ac, as long as possible.

Moreover, in the conventional IC-card reader/writer 50, it is afraid that permanent deformations may occur in the contact spring 53a.

The permanent deformations will be explained with reference to FIGS. 10A and 10B.

FIG. 10A is an explanatory view showing a state before the end part rides the main surface of the IC-card. FIG. 10B is an explanatory view showing a state after the end part has rid the main surface of the IC-card.

In FIGS. 10A and 10B, when the end part 53ab rides the main surface of the IC-card 80, pushing force given by the front end of the IC-card 80 is directly exerted from the end part 53ab to the terminal part 53aa. Thereby, as the IC-card 80 travels into the insertion chamber 52 (FIG. 9A), internal stress at the end part 53ab becomes larger. As a result, there is a possibility that permanent deformations occur in the contact spring 53a.

On the other hand, in order to reduce an area of the insertion chamber, it is known that an arrangement of the contact springs is improved as described in U.S. Pat. No. 5,269,707.

Such improved arrangement of the contact springs will be explained with reference to FIG. 11.

FIG. 11 is an explanatory view showing the arrangement of the contact springs of another conventional IC-card reader/writer described in U.S. Pat. No. 5,269,707.

As shown in FIG. 11, three shorter contact springs 61a are disposed inclined with respect to a direction perpendicular to the row of the contact regions at a predetermined angle, and come in contact with three contact regions C5–C7, respectively. Similarly, three longer contact springs 61b are disposed inclined with respect to the direction perpendicular to the row of the contact regions at the predetermined angle, and come in contact with three contact regions C1–C3, respectively. Furthermore, the three shorter contact springs 61a and the three longer contact springs 61b are located alternately in a direction perpendicular to the row of the contact regions. Thus, this conventional IC-card reader/writer was able to reduce the area of the insertion chamber by such improvement of the arrangement of the contact springs.

However, in this conventional IC-card reader/writer, in order to insulate the contact spring 61a from the contact spring 61b, it is impossible to select a width W of the contact springs 61a and 61b to be larger than a half of a distance P between two contact regions. Therefore, because of such small width of the width W, there is a problem that strength of the contact springs 61a and 61b is not sufficient. Furthermore, in this conventional IC-card reader/writer, it is preferable that the IC-card 80 is inserted from directions shown by arrows Y and Z in FIG. 12 showing a side view of the contact spring 61a. That is, in this conventional IC-card reader/writer, it is not preferable that the IC-card 80 is inserted from an opposite direction to the direction shown by the arrow Z.

OBJECT AND SUMMARY OF THE INVENTION

The object of the present invention is to provide an IC-card reader/writer for an IC-card that can solve the aforementioned problems.

In order to achieve the above-mentioned object, an IC-card reader/writer for an IC-card in accordance with the present invention comprises:

an insertion chamber for receiving the IC-card, plural contact springs for contacting plural contact regions provided in a front row of an IC-card, and at least two contact springs for contacting plural contact regions provided in a rear row of the IC-card, wherein the plural contact springs are disposed between at least two contact springs in the insertion chamber.

According to the IC-card reader/writer for the IC-card of the present invention, the plural contact springs contact the plural contact regions provided in the front row of the IC-card, and at least two contact springs contact the plural contact regions provided in the rear row of the IC-card. And the plural contact springs are disposed between at least two contact springs in the insertion chamber. Thereby, it is possible that a depth of the insertion chamber is nearly equal to a length between the contact regions provided in the rear row and the front end of the IC-card. As a result, the size of the IC-card reader/writer can be reduced drastically.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 3B is a cross sectional view taken on line IIIB—IIIB in FIG. 3A.

DESCRIPTION OF THE PREFERRED EMBODIMENTS

Hereafter, preferred embodiments of the present invention are described with reference to the accompanying drawings.

<<FIRST EMBODIMENT>>

Figure 7:
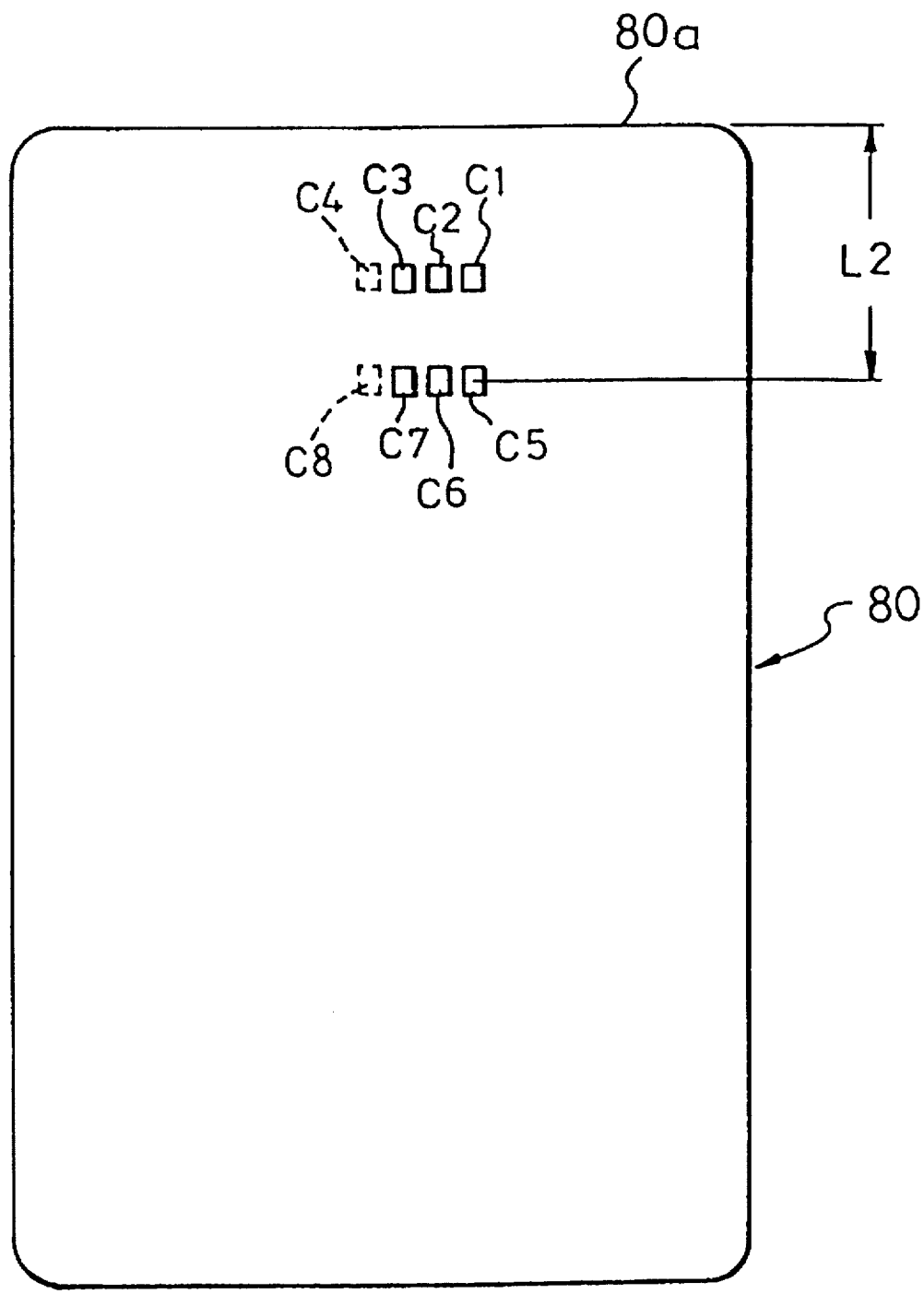
FIG. 7 is a plan view showing an arrangement of eight contact regions of the IC-card.
Figure 8:
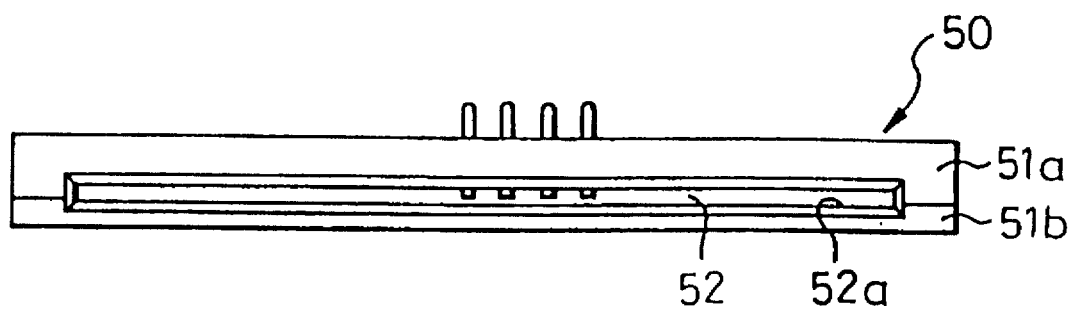
FIG. 8 is a front view showing a conventional IC-card reader/writer described in U.S. Pat. No. 5,334,827.
Figure 9A:
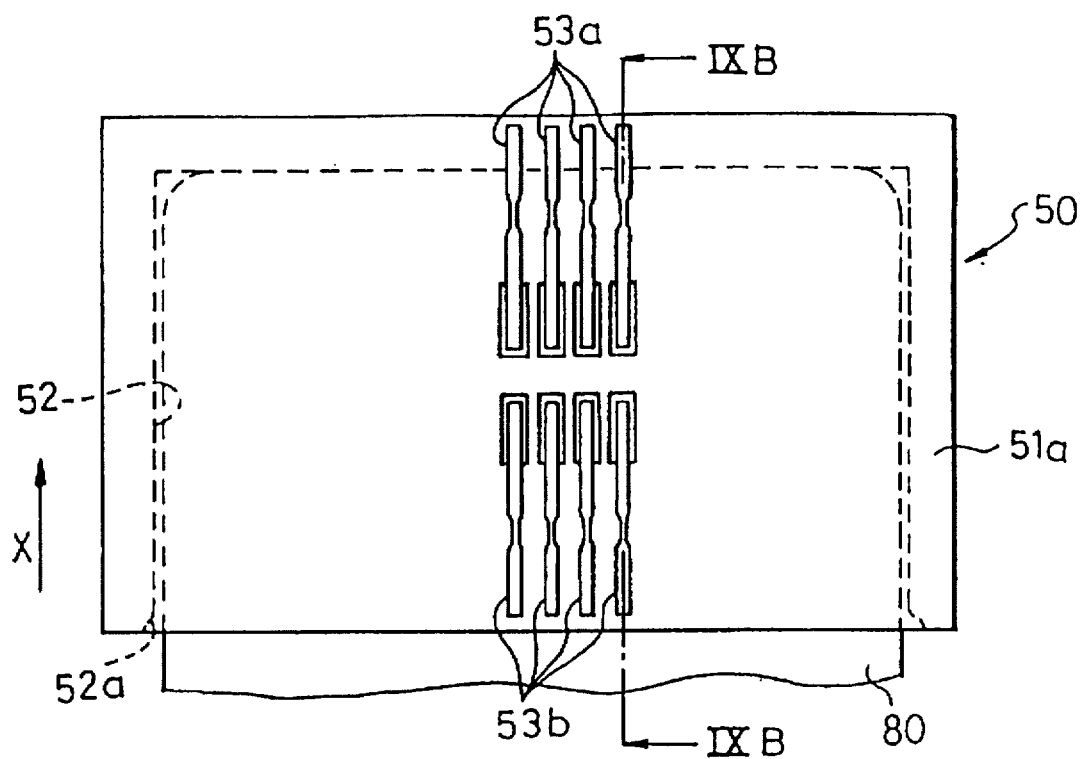
FIG. 9A is a plan view showing the conventional IC-card reader/writer of FIG. 8 in a state receiving the IC-card.
Figure 9B:
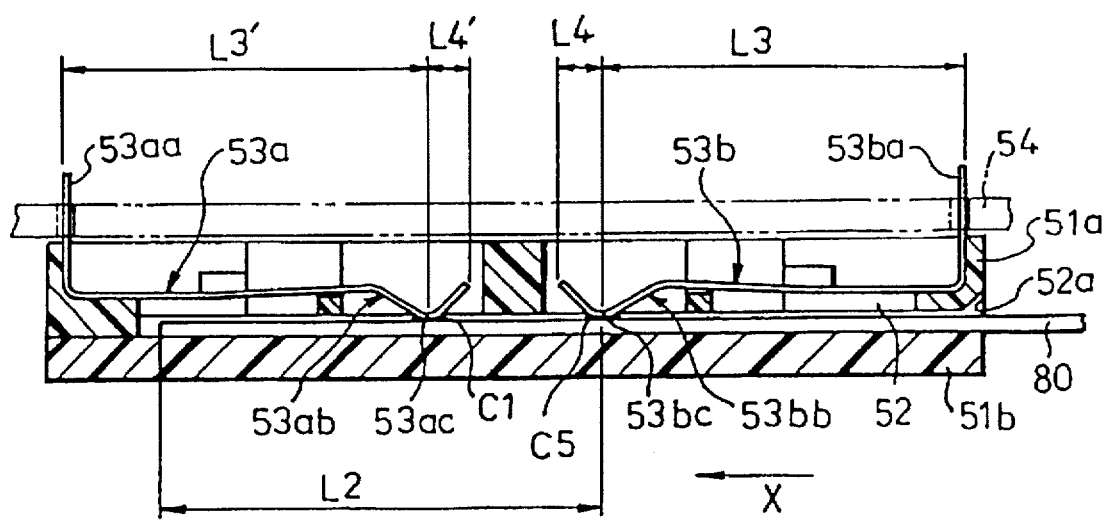
FIG. 9B is a cross sectional view taken on line IXB—IXB in FIG. 9A.

Firstly, an IC(integrated circuit)-card 80 to be used for an IC-card reader/writer 1 of the present invention will be elucidated with reference to FIG. 7.

FIG. 7 is a plan view showing an arrangement of eight contact regions of the IC-card. In FIG. 7, the IC-card 80 is standardized in accordance with the ISO standard 7816, and comes in general use now.

As shown in FIG. 7, eight contact regions C1, C2, C3, C4, C5, C6, C7 and C8 are located in the respective predetermined positions according to the ISO standard 7816 so that the eight contact regions C1–C8 are provided in two rows. Hereinafter, in the two rows, one row constituted with the four contact regions C1–C4 is referred to as a "a front row", and the other row constituted with the four contact regions C5–C8 is referred to as a "a rear row". Furthermore, in the ISO standard 7816, the respective functions of the eight contact regions C1–C8 are defined as follows:

The function of the contact region C1 is "VCC".

The function of the contact region C2 is "RST".

The function of the contact region C3 is "CLK".

The function of the contact region C5 is "GND".

The function of the contact region C6 is "VPP".

The function of the contact region C7 is "I/O".

The contact regions C4 and C8 are reserved contact regions for future use.

As has been explained in the above, the eight contact regions C1–C8 are defined in accordance with the ISO standard 7816. However, the contact regions C4 and C8 are provided for assignment of additional function for future use; therefore, the contact regions C4 and C8 are not always to be formed on the IC-card 80.

In fact, the IC-card 80 has generally the six contact regions C1–C3 and C5–C7 without the contact regions C4 and C8 shown by a broken line in FIG. 7. Furthermore, the IC-card 80 mostly generates a programming voltage, which is for erasuring stored data in an including power supply circuit (not shown). Therefore, the programming voltage need not be supplied from the IC-card reader/writer 1 via the contact region C6.

Accordingly, when the contact regions C1, C2, C3, C5 and C7 are electrically connected with the IC-card reader/writer 1, it is possible that the IC-card reader/writer 1 reads the data from the IC-card 80 or/and writes the data to the IC-card 80. Therefore, the IC-card reader/writer 1 adapted for the above-mentioned contact regions C1, C2, C3, C5 and C7 will be shown in the description of this embodiment.

Figure 1:
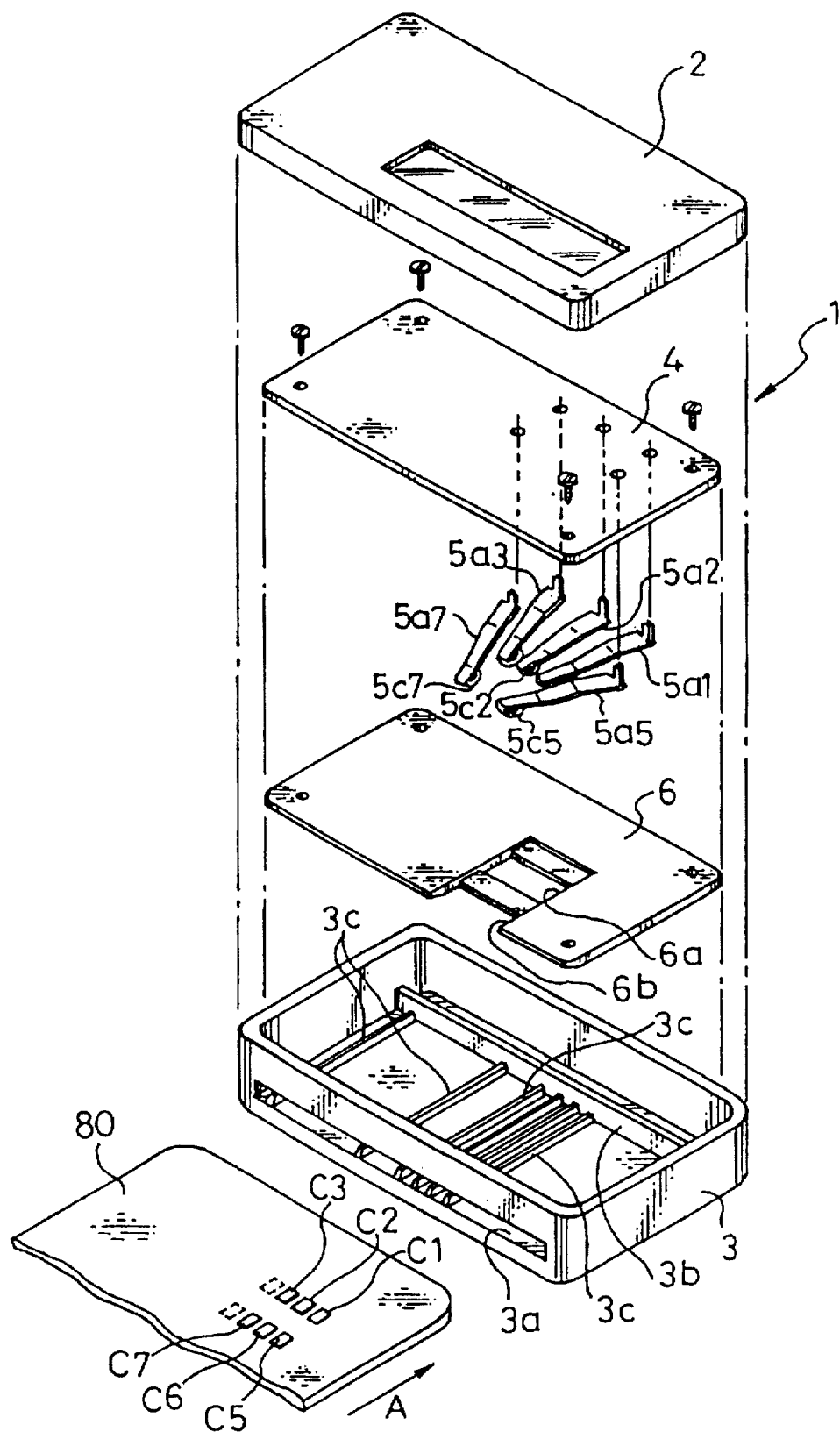
FIG. 1 is an exploded perspective view showing an IC-card reader/writer for an IC-card of the present invention.
Figure 2:
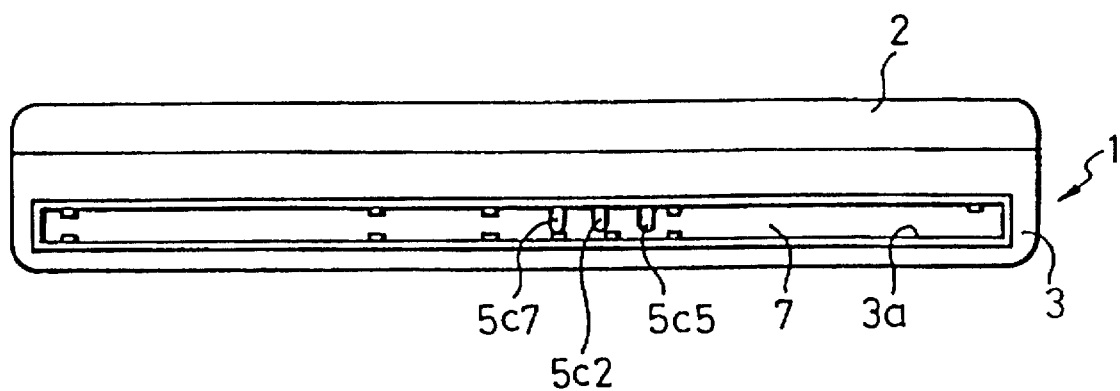
FIG. 2 is a front view showing the IC-card reader/writer of the present invention.

FIG. 1 is an exploded perspective view showing an IC-card reader/writer for an IC-card of the present invention. FIG. 2 is a front view showing the IC-card reader/writer of the present invention.

As shown in FIGS. 1 and 2, the IC-card reader/writer 1 comprises a cover 2 and a case 3 having an opening 3a. The cover 2 is engaged with the case 3, so that an outer housing of the IC-card reader/writer 1 is configured with the cover 2 and the case 3. The case 3 contains a printed circuit board 4, three contact springs 5a1, 5a2, and 5a3, two contact springs 5a5 and 5a7 and an inner lid 6. The opening 3a serves as an entrance of an insertion chamber 7. The inner surface of the case 3 is partitioned by a stopper wall 3b of the case 3, and the inner lid 6. Furthermore, the case 3 has plural ribs 3c for supporting the IC-card 80. The plural ribs 3c are disposed inside the insertion chamber 7 in the direction parallel with inserting direction (shown by arrow A in FIG. 1) of the IC-card 80.

The printed circuit board 4 is fixed to the inner lid 6 by plural screws or the like. The three contact springs 5a1, 5a2, and 5a3 and the two contact springs 5a5 and 5a7 are disposed to the printed circuit board 4 so that the three contact springs 5a1, 5a2, and 5a3 are disposed between the two contact springs 5a5 and 5a7, being isolated from each other. Distance between two of the three contact springs 5a1, 5a2, and 5a3 decreases toward an opposite direction of the inserting direction A, and distance between two of the two contact springs 5a5 and 5a7 decreases toward the opposite direction of the inserting direction A. When the IC-card 80 is inserted in the innermost position through the insertion chamber 7, the three contact springs 5a1, 5a2, and 5a3 come in contact with the contact regions C1, C2 and C3 which are disposed in the front row, respectively. Furthermore, the two contact springs 5a5 and 5a7 come in contact with the contact regions C5 and C7 which are disposed in the rear row, respectively. Thereby, data are transmitted between the IC-card reader/writer 1 and the IC-card 80.

The inner lid 6 has a first cut-out part 6a for receiving three folded parts 5c1, 5c2, and 5c3 of the three contact springs 5a1, 5a2, and 5a3 and a second cutout part 6b for receiving two folded parts 5c5 and 5c7 of the two contact springs 5a5 and 5a7.

The three contact springs 5a1, 5a2, and 5a3 and two contact springs 5a5 and 5a7 and 5b will be elucidated with reference to FIGS. 3A, 3B, 4A and 4B concretely.

Figure 3A:
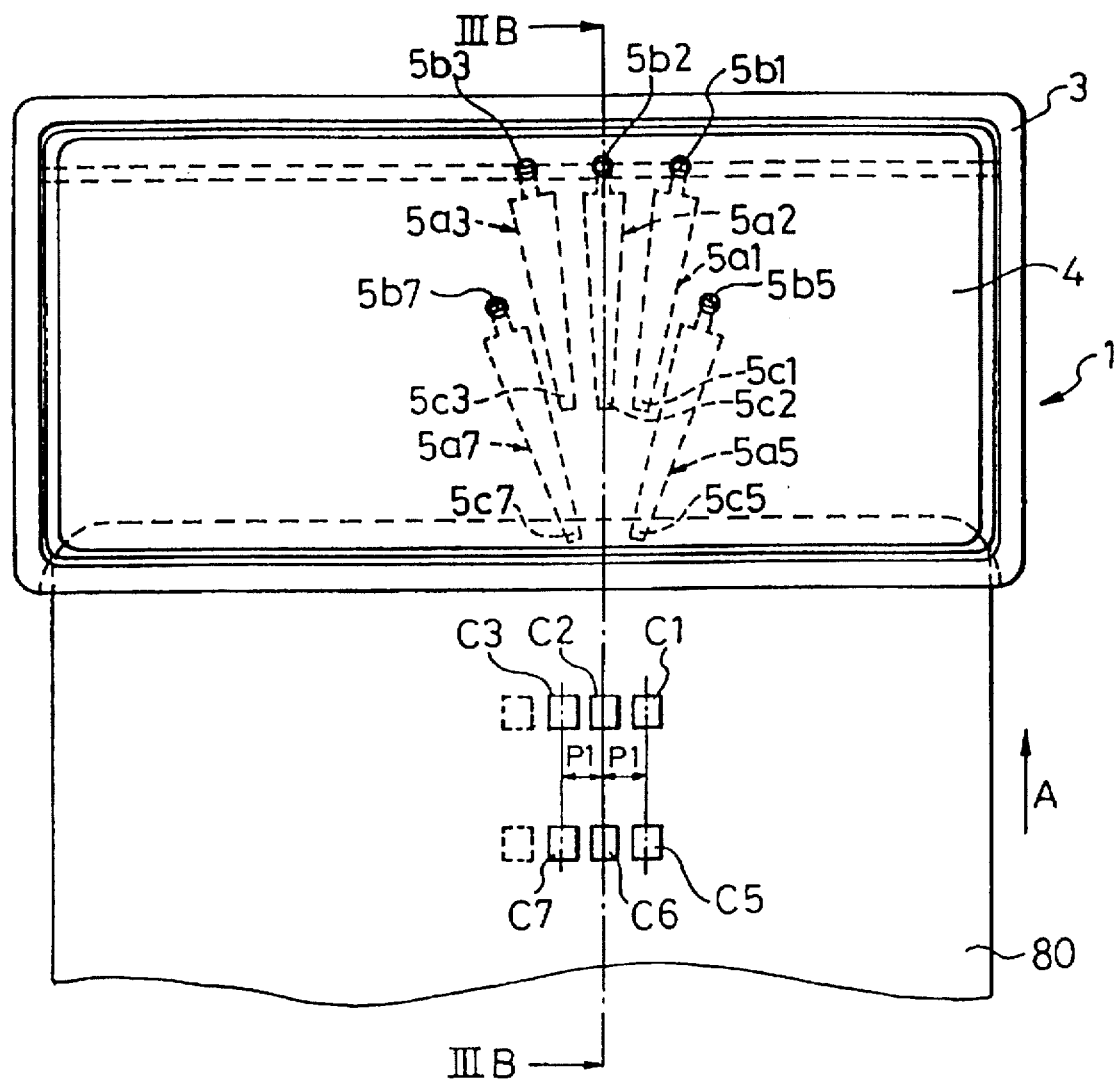
FIG. 3A is a plan view showing a state before the IC-card is inserted in the IC-card reader/writer of the present invention.
Figure 4A:
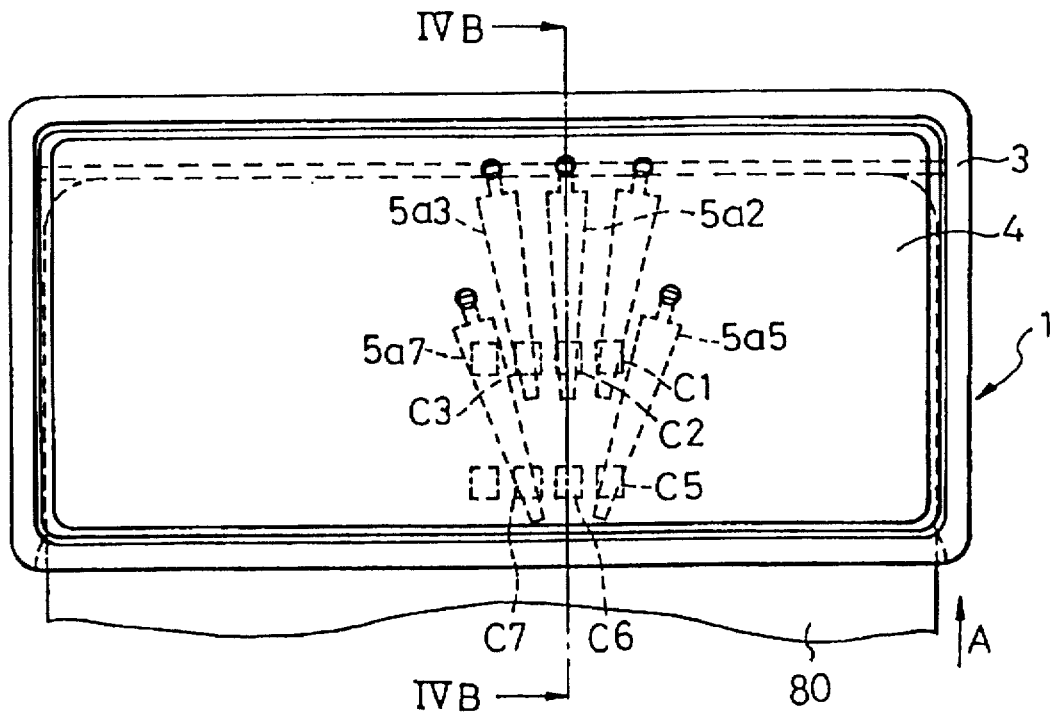
FIG. 4A is a plan view showing a state after the IC-card is inserted in the IC-card reader/writer of the present invention.
Figure 4B:
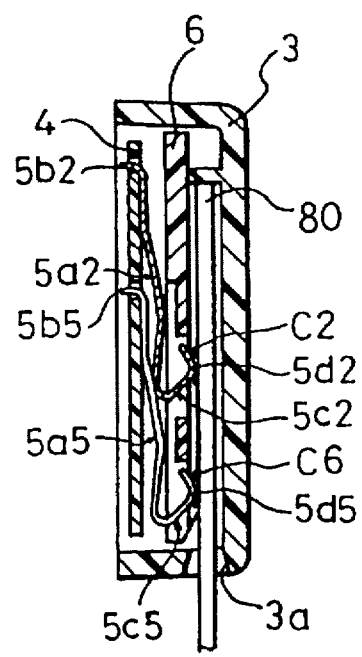
FIG. 4B is a cross sectional view taken on line IVB—IVB in FIG. 4A.

FIG. 3A is a plan view showing a state before the IC-card is inserted in the IC-card reader/writer of the present invention. FIG. 3B is a cross sectional view taken on line IIIB—IIIB in FIG. 3A. FIG. 4A is a plan view showing a state after the IC-card is inserted in the IC-card reader/writer of the present invention. FIG. 4B is a cross sectional view taken on line IVB—IVB in FIG. 4A.

In FIGS. 3A, 3B, 4A and 4B, illustration of the cover 2 is omitted for the sake of simplicity of drawings.

In FIGS. 3A, 3B, 4A and 4B, the three contact springs 5a1, 5a2, and 5a3 are of the same configuration. In the following description, the contact spring 5a2 as representative is only explained. The contact spring 5a2 comprises a terminal part 5b2 at one end part thereof and the folded part 5c2 having a contact 5d2 at the other end part. The folded part 5c2 is formed by bending the other end part by about 145° to form a lying V-letter shape. And the contact 5d2 is formed by bending a cusp part of the other end part by about 110° to form a little flattened V-shape.

The terminal part 5b2 is fixed to the printed circuit board 4 by soldering, or the like. The folded part 5c2 is located in the first cut-out part 6a so that the contact 5d2 is exposed downward from the first cut-out part 6a.

As shown FIGS. 3A and 3B, the folded part 5c2 of the contact spring 5a2 is located closer to the opening 3a in comparison with the terminal part 5b2 and that the contact spring 5a2 is disposed in parallel with the inserting direction A. As shown in FIG. 3A, in the contact springs 5a1 and 5a3, folded parts 5c1 and 5c3 are located closer to the opening 3a in comparison with terminal parts 5b1 and 5b3, respectively. Each of the contact springs 5a1 and 5a3 is disposed inclined to the contact spring 5a2 in such manner that distance between the terminal parts 5b1 and 5b2, as well as, distance between the terminal parts 5b2 and 5b3 are larger than distance between the folded parts 5c1 and 5c2, as well as, distance between the folded parts 5c2 and 5c3, respectively. Furthermore, each of the contact springs 5a1, 5a2, and 5a3 is formed so that its contact has a downward pressing force toward the bottom of the case 3. Thereby, each of the folded parts 5c1, 5c2, and 5c3 is exposed downward from the first cutout part 6a into the insertion chamber 7. As a result, when the IC-card 80 is inserted in the innermost position of the insertion chamber 7, the three contact springs 5a1, 5a2, and 5a3 come in contact with the contact regions C1, C2, and C3 provided in the front row, respectively.

Similarly, the two contact springs 5a5 and 5a7 are of the same configuration. In the following description, the contact spring 5a5 as representative is only explained. The contact spring 5a5 comprises a terminal part 5b5 at one end part thereof and the folded part 5c5 having a contact 5d5 at the other end part. The folded part 5c5 is formed by bending the other end part by about 145° to form a lying V-letter shape. And the contact 5d5 is formed by bending a cusp part of the other end part by about 110° to form a little flatten V-shape.

The terminal part 5b5 is fixed to the printed circuit board 4 by soldering, or the like. The folded part 5c5 is located in the second cut-out part 6b so that the contact 5d5 is exposed downward from the second cut-out part 6b.

As shown in FIG. 3A, in the contact springs 5a5 and 5a7, the folded parts 5c5 and 5c7 are located closer to the opening 3a in comparison with terminal parts 5b5 and 5b7, respectively. Each of the contact springs 5a5 and 5a7 is disposed inclined to the three contact springs 5a1, 5a2, and 5a3 in such manner that distance between the terminal parts 5b5 and 5b7 is larger than distance between the folded parts 5c5 and 5c7. Furthermore, each of the contact springs 5a5 and 5a7 is formed so that its contact has a downward pressing force toward the bottom of the case 3. Thereby each of the folded parts 5b5 and 5b7 is exposed downward form the second cut-out part 6b into the insertion chamber 7. As a result, when the IC-card 80 is inserted in the innermost position of the insertion chamber 7, the two contact springs 5a5 and 5a7 come in contact with the contact regions C5 and C7 provided in the rear row, respectively.

As has been explained in the above, the three contact springs 5a1, 5a2, and 5a3 are arranged between the two contact springs 5a5 and 5a7. Thereby, it is possible that a depth L1 (shown in FIG. 3B) of the insertion chamber 7 is substantially equal to a length L2 (shown in FIG. 7) between the contact regions C5, C6, and C7 in the rear row and a front end 80a (FIG. 7) of the IC-card 80. Furthermore, the three contact springs 5a1, 5a2, and 5a3 and the two contact springs 5a5 and 5a7 are disposed on the same face of the printed circuit board 4 without overlapping with each other as shown in FIG. 3B. Thereby, height of the case 3 can be made small. Thus, the size of the IC-card reader/writer 1 can be reduced drastically.

Apart from the aforementioned explanation, wherein the three contact springs 5a1, 5a2, and 5a3 and the two contact springs 5a5 and 5a7 are fixed to the printed circuit board 4, an alternative construction may be such that the three contact springs 5a1, 5a2, and 5a3 and the two contact springs 5a5 and 5a7 are fixed to one of the case 3 and the inner lid 6.

Configurations of the contact spring 5a2 will be concretely elucidated with reference to FIGS. 5A, 5B, 6A, 6B and 6C.

Figure 5A:
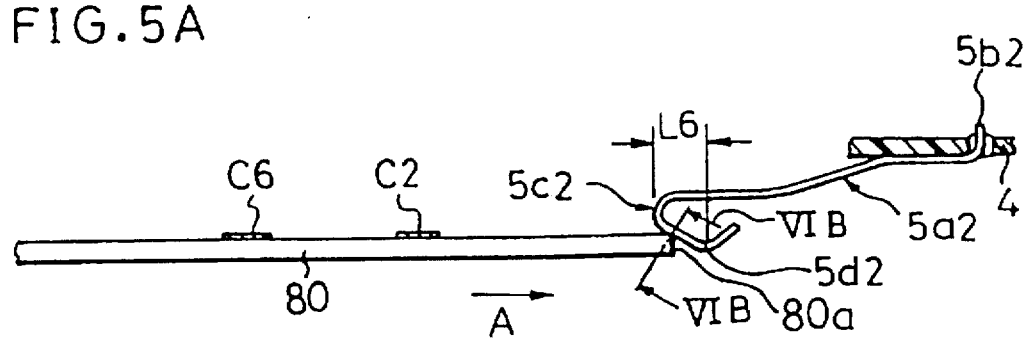
FIG. 5A is an explanatory view showing a state before a folded part of the present invention rides a main surface of the IC-card.
Figure 5B:
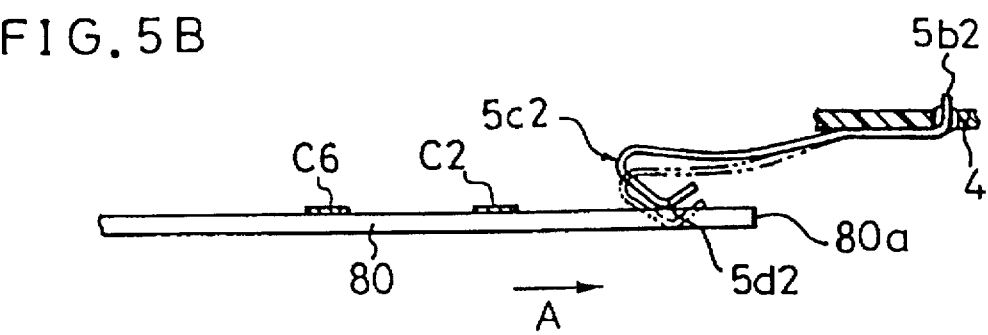
FIG. 5B is an explanatory view showing a state after the folded part of the present invention has rid the main surface of the IC-card.
Figure 6A:
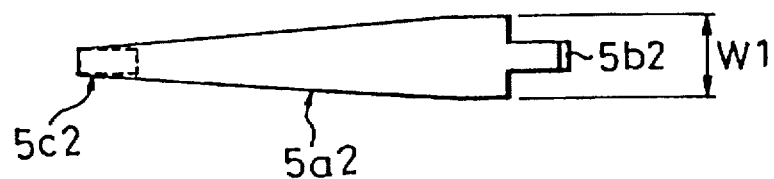
FIG. 6A is a plan view showing a contact spring of the present invention.
Figure 6B:
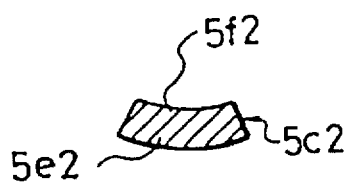
FIG. 6B is a cross sectional view, which is taken on line VI—VI in FIG. 5A, showing an example of the contact spring of the present invention at the part where it touches front edge of the IC-card.
Figure 6C:
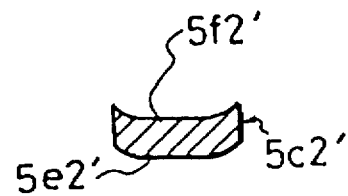
FIG. 6C is a cross sectional view, which is taken on line VI—VI in FIG. 5A, showing another example of contact spring of the present invention at the part where it touches front edge of the IC-card.

FIG. 5A is an explanatory view showing a state before a folded part of the present invention rides a main surface of the IC-card. FIG. 5B is an explanatory view showing a state after the folded part of the present invention has rid the main surface of the IC-card. FIG. 6A is a plan view showing a contact spring of the present invention. FIG. 6B is a cross sectional view, which is taken on line VI—VI in FIG. 5A, showing an example of the contact spring of the present invention at the part where it touches front edge of the IC-card. FIG. 6C is a cross sectional view, which is taken on line VI—VI in FIG. 5A, showing another example of the contact spring of the present invention at the part where it touches front edge of the IC-card.

As shown in FIGS. 5A and 5B, there is a difference between the contact spring 5a2 and the conventional contact spring that the present contact spring 5a2 has the folded part 5c2 at closer position to the opening 3a (FIG. 3B) in comparison with the contact 5d2.

Figure 10A:
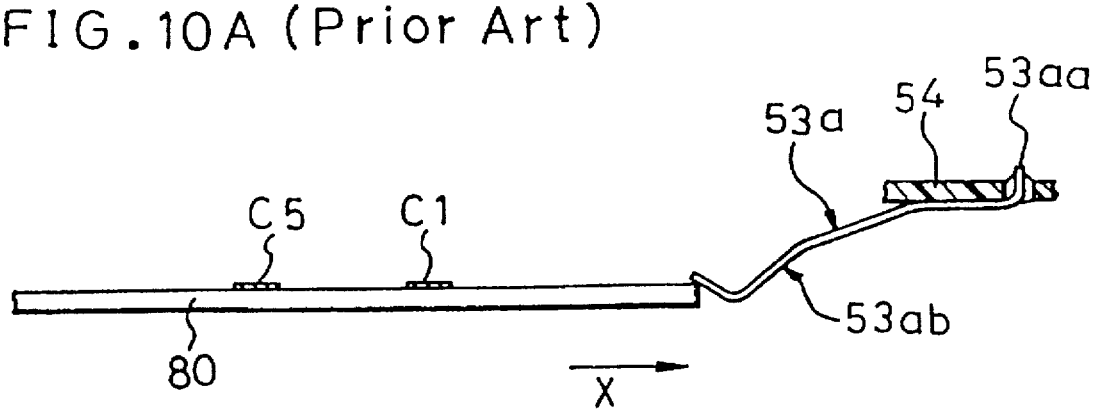
FIG. 10A is an explanatory view showing a state before the end part rides the main surface of the IC-card.
Figure 10B:
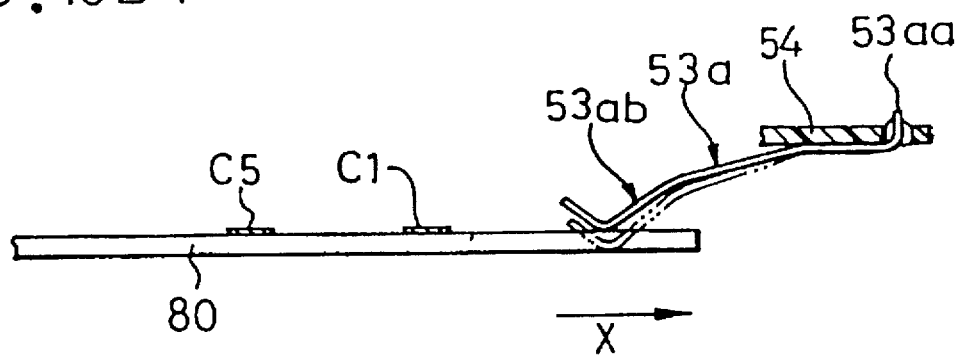
FIG. 10B is an explanatory view showing a state after the end part has rid the main surface of the IC-card.
Figure 11:
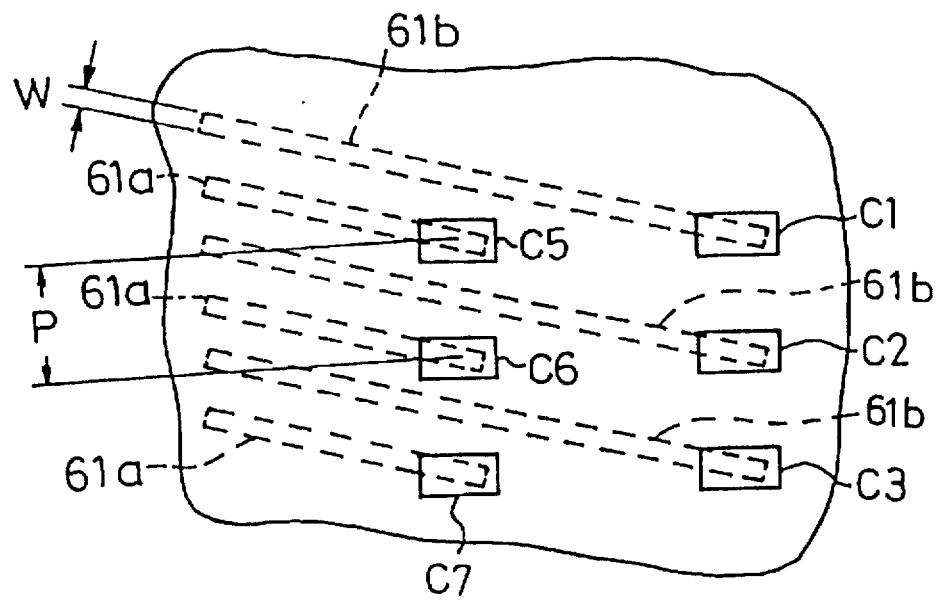
FIG. 11 is an explanatory view showing the arrangement of the contact springs of another conventional IC-card reader/writer described in U.S. Pat. No. 5,269,707.
Figure 12:
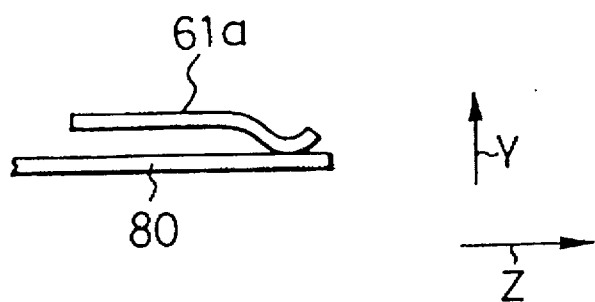
FIG. 12 is a side view showing a contact spring of another conventional IC-card reader/writer.

When the folded part 5c2 rides the main surface of the IC-card 80, pushing force given by the front edge of the IC-card 80 is exerted to the inclined face of the folded part 5c2, and the free end of the contact 5d2 is pushed up by the pushing force from the front edge of the IC-card 80. Therefore, the taper slope at the part between the folded part 5c2 and the contact 5d2 is decreased as a result of the pushing up of the free end. Accordingly, the riding of the contact 5d2 on the IC-card 80 becomes further easily, and therefore, there is no fear of deformation or damage in the contact spring 5a2 as in the prior art shown in FIGS. 10A and 10B. For example, the above-mentioned pushing force is not exerted on the contact 5d2. Therefore, it is possible to prevent occurrence of permanent deformations in the contact 5d2.

Furthermore, in the contact spring 5a2, a portion L6 effectively operates as an elastic member for the contact 5d2.

Therefore, it is possible to shorten a length of the contact spring 5a2 in comparison with a length of the conventional contact spring.

Moreover, according to an arrangement of the contact springs 5a1, 5a2, 5a3, 5a5, and 5a7, width W of each contact springs 5a1, 5a2, 5a3, 5a5, and 5a7 can be modified larger in comparison with the conventional contact spring. For example, it is possible that the width W of the contact can be made larger than a half of a pitch P1 (shown in FIG. 3A) between the two contact regions of the contact regions by improved the arrangement of the contact springs 5a1, 5a2, 5a3, 5a5, and 5a7 in accordance with the present invention. Furthermore, it is possible that the width W1 of the widest end of the contact can be made larger than of the pitch P1. Thereby, stress generated in the contact spring 5a2 can be decreased drastically. As a result, durability of the contact springs 5a1, 5a2, 5a3, 5a5, and 5a7 can be increased, and reliance of the contact springs 5a1, 5a2, 5a3, 5a5, and 5a7 can be increased. Furthermore, insulating distance between the two contact springs of the contact springs 5a1, 5a2, 5a3, 5a5, and 5a7 can be modified to be sufficiently large. Thereby, it is possible to prevent a short-circuit between the two contact springs caused by adhesion of conductive extraneous materials or the like.

Furthermore, as shown in FIG. 6B, sectional shape of the folded part 5c2 is formed into an arch-shape so that an outer surface 5e2 contacting the front end 80a is bent greater than an inner surface 5f2. Thereby, the folded part 5c2 can ride the main surface of the IC-card 80 smoothly. As a result, it is possible to prevent occurrence of damage on the main surface of the IC-card 80.

In the sectional shape of the folded part 5c2', as shown in FIG. 6C, end parts of the outer surface 5e2' and the inner surface 5f2' may be only bent.

<<SECOND EMBODIMENT>>

As a second embodiment of the present invention, an IC-card reader for an IC-card has substantially the same configuration with the IC-card reader/writer 1 of the first embodiment, and is used for reading only stored data in the IC-card 80.

The IC-card reader for the IC-card comprises: an insertion chamber 7 for receiving said IC-card 80, plural contact springs 5a1, 5a2, and 5a3 for contacting plural contact regions C1–C4 provided in a front row of said IC-card 80, and at least two contact springs 5a5 and 5a7 for contacting plural contact regions C5–C8 provided in a rear row of said IC-card 80, wherein said plural contact springs 5a1, 5a2, and 5a3 are disposed between the at least two contact springs 5a5 and 5a7 in the insertion chamber 7 as shown in FIG. 1–FIG. 6C.

In further aspect of the IC-card reader of the second embodiment, the front row and the rear row are at a direction perpendicular to an inserting direction of the IC-card 80, and the rear row is closer to an opening 3a of the insertion chamber 7 in comparison with the front row.

In further aspect of the IC-card reader of the second embodiment, distance between two of the plural contact springs 5a1, 5a2, and 5a3 decreases toward an opposite direction of the inserting direction of the IC-card 80, and distance between two of the at least two contact springs 5a5 and 5a7 decreases toward the opposite direction of the inserting direction of the IC-card 80.

In further aspect of the IC-card reader of the second embodiment, the IC-card reader comprises: an insertion chamber 7 for receiving the IC-card 80, plural contact springs 5a1, 5a2, and 5a3 for contacting plural contact regions C1–C4 provided in a front row of the IC-card 80, and at least two contact springs 5a5 and 5a7 for contacting plural contact regions C5–C8 provided in a rear row of said IC-card 80; wherein each of the plural contact springs 5a1, 5a2, and 5a3 comprises a terminal part 5b1, 5b2, and 5b3 and a folded part 5c1, 5c2, and 5c3 for contacting the plural contact regions C1–C4 provided in the front row, the folded part 5c1, 5c2, and 5c3 being bent toward the terminal part 5b1, 5b2, and 5b3, and the folded part 5c1, 5c2, and 5c3 being located closer to the opening 3a of the insertion chamber 7 in comparison with the terminal part 5b1, 5b2, and 5b3; and each of the at least two contact springs 5a5 and 5a7 comprises a terminal part 5b5 and 5b7 and a folded part 5c5 and 5c7 for contacting the plural contact regions C5–C8 provided in the rear row, the folded part 5c5 and 5c7 being bent toward the terminal part 5b5 and 5b7, and the folded part 5c5 and 5c7 being located closer to the opening 3a of the insertion chamber 7 in comparison with the terminal part 5b5 and 5b7.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An IC-card reader/writer for an IC-card comprising:

an insertion chamber for receiving said IC-card, plural contact springs for contacting plural contact regions provided in a front row of said IC-card, and at least two contact springs for contacting plural contact regions provided in a rear row of said IC-card, wherein said plural contact springs are disposed between said at least two contact springs in said insertion chamber.

2. An IC-card reader/writer for an IC-card in accordance with claim 1, wherein said front row and said rear row are at a direction perpendicular to an inserting direction of said IC-card, and said rear row is closer to an opening of said insertion chamber in comparison with said front row.

3. An IC-card reader/writer for an IC-card in accordance with claim 2, wherein distance between two of said plural contact springs decreases toward an opposite direction of said inserting direction of said IC-card, and distance between two of said at least two contact springs decreases toward said opposite direction of said inserting direction of said IC-card.

4. An IC-card reader/writer for an IC-card comprising:

an insertion chamber for receiving said IC-card, plural contact springs for contacting plural contact regions provided in a front row of said IC-card, and at least two contact springs for contacting plural contact regions provided in a rear row of said IC-card, wherein each of said plural contact springs comprises a terminal part and a folded part for contacting said plural contact regions provided in said front row, said folded part being bent toward said terminal part, and said folded part being located closer to said opening of said insertion chamber in comparison with said terminal part, and each of said at least two contact springs comprises a terminal part and a folded part for contacting said plural contact regions provided in said rear row, said folded part being bent toward said terminal part, and said folded part being located closer to said opening of said insertion chamber in comparison with said terminal part.

5. An IC-card reader for an IC-card comprising:

an insertion chamber for receiving said IC-card, plural contact springs for contacting plural contact regions provided in a front row of said IC-card, and at least two contact springs for contacting plural contact regions provided in a rear row of said IC-card, wherein said plural contact springs are disposed between said at least two contact springs in said insertion chamber.

6. An IC-card reader for an IC-card in accordance with claim 5, wherein said front row and said rear row are at a direction perpendicular to an inserting direction of said IC-card, and said rear row is closer to an opening of said insertion chamber in comparison with said front row.

7. An IC-card reader for an IC-card in accordance with claim 6, wherein distance between two of said plural contact springs decreases toward an opposite direction of said inserting direction of said IC-card, and distance between two of said at least two contact springs decreases toward said opposite direction of said inserting direction of said IC-card.

8. An IC-card reader for an IC-card comprising:

an insertion chamber for receiving said IC-card, plural contact springs for contacting plural contact regions provided in a front row of said IC-card, and at least two contact springs for contacting plural contact regions provided in a rear row of said IC-card, wherein each of said plural contact springs comprises a terminal part and a folded part for contacting said plural contact regions provided in said front row, said folded part being bent toward said terminal part, and said folded part being located closer to said opening of said insertion chamber in comparison with said terminal part, and each of said at least two contact springs comprises a terminal part and a folded part for contacting said plural contact regions provided in said rear row, said folded part being bent toward said terminal part, and said folded part being located closer to said opening of said insertion chamber in comparison with said terminal part.

* * * * *